UNITED STATES PATENT OFFICE.

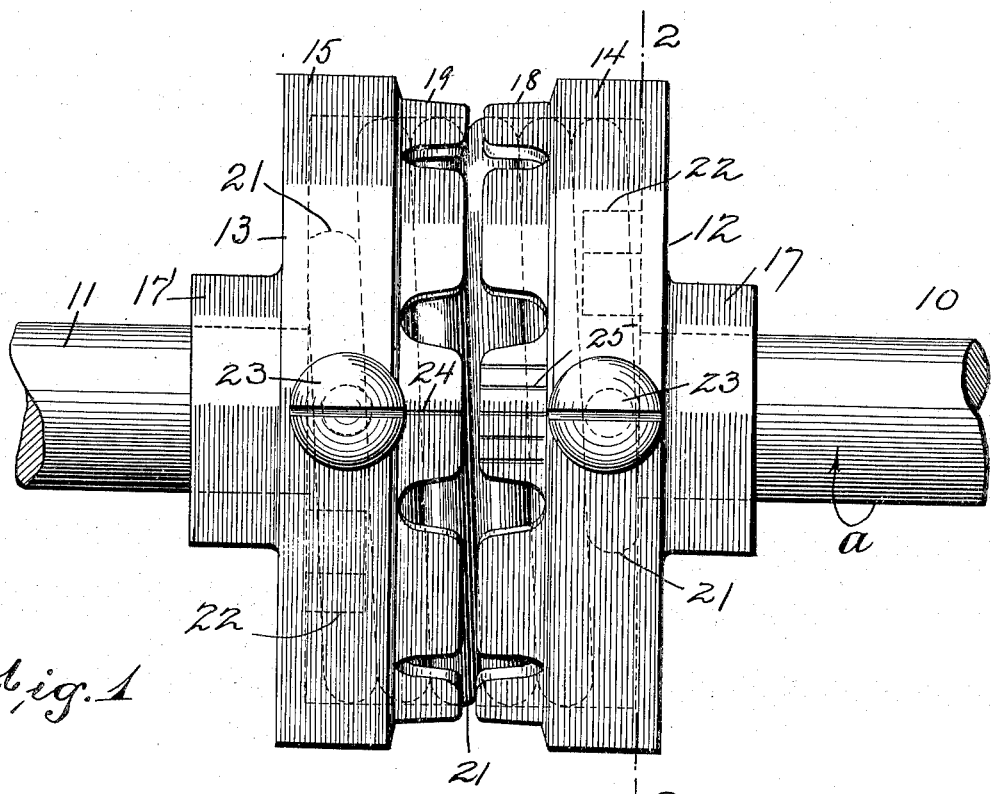
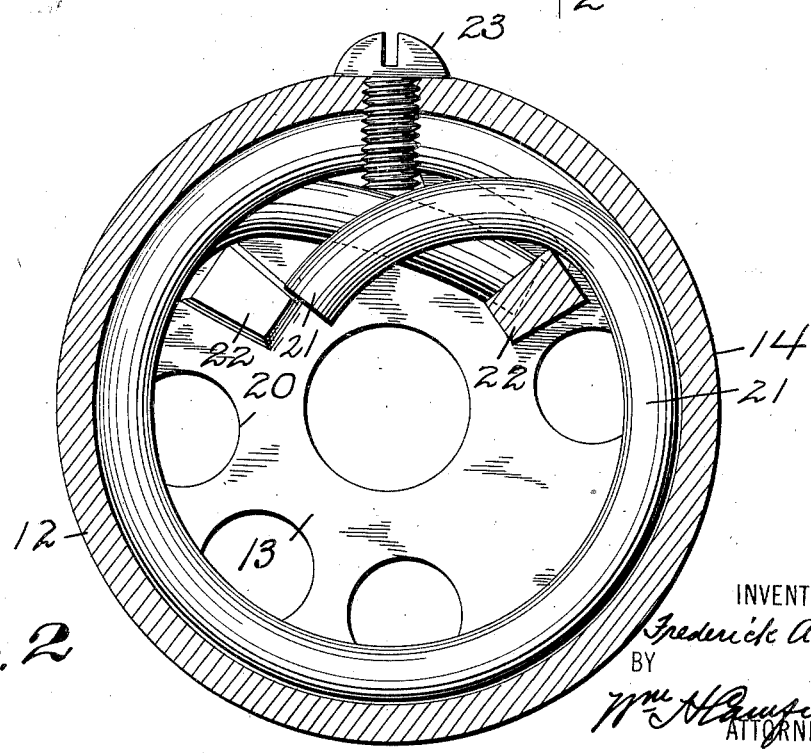

FREDERICK A. RUFF, OF NEWARK, NEW JERSEY.

COUPLING.

1,334,557.  Specification of Letters Patent.  Patented Mar. 23, 1920.

Application filed September 19, 1919. Serial No. 324,927.

*To all whom it may concern:*

Be it known that I, FREDERICK A. RUFF, a citizen of the United States, and a resident of Newark, county of Essex, and State of New Jersey, have invented certain new and useful Improvements in Couplings, of which the following is a specification.

This invention relates to an improved coupling for the abutting ends of two shafts so that one may be driven from the other by means of a spring connection.

The invention consists of a coupling of this type which has a limited degree of flexibility and is thus utilized particularly in places where the coupling is adapted to compensate for vibration, and other situations where there is a lack of alinement of the two shafts.

The invention further consists of a coupling of this kind which can be adjusted easily so that the relative rotative position of one shaft to the other can be changed, this being particularly desirable in timing magneto or other electrical ignition systems.

The invention is illustrated in the accompanying drawing, in which Figure 1 is a top view of my improved coupling, and Fig. 2 is a vertical section on line 2—2 in Fig. 1.

In the drawing 10 illustrates the driving member and 11 the driven member; these being represented by shafts, and the arrow *a* indicates the direction of rotation. The coupling comprises two members 12 and 13, which are provided with flanges 14 and 15, respectively, so that the general form of each member is cup-shaped, each member being suitably secured to its shaft, collars 17 being provided for this purpose, and any suitable fastening means (not shown) can be used for securing these members to the ends of the shafts.

In order to secure a light construction, the extensions 18 and 19 of the flanges 14 and 15 can be made thinner and cut away at their edges, and openings 20 can also be made in the faces of the cup-shaped members to provide for a reduction in weight.

Within the members is a coil spring 21, which is arranged to be utilized for transmitting power from one cup-shaped member to the other, and the spring is secured in the cup-shaped member so that a positive rotation in the desired direction causes the member to engage the spring with a tendency to unwind it. In other words, the direction of rotation is the reverse of the direction of winding of the spring, and the spring being in the housing, it can not expand or enlarge its diameter and it thus acts to cause a positive transmission of power.

The spring is secured to the cup-shaped members, and the device is preferably made so that at least the connection of one end of the spring to one of the cup-shaped members permits adjustment. In the form shown both ends are so constructed, and to provide for the fastening in place, lugs 22 on the inner faces of the cup-shaped members, and screws 23 adjacent thereto, pass through the flanges 14 and 15 and bear against the ends of the spring sufficiently to cause them to be bent so that there is no chance of slipping, as between the spring and the member.

When power is applied to the element 10, the member 12 turns the spring in the direction that is opposite to the winding of the spring and the spring is caused to engage at its periphery with the inside of the flanges 14 and 15 and their extensions 18 and 19, through the lugs 22 and 23 on the lug member, to transmit its rotation to the shaft 11. A slight reversal of rotation of the driving shaft 11 has a tendency to wind the spring up, and in this way the device takes care of any backlash.

The spring permits and compensates for slight changes in the alinement of the shafts 10 and 11, this being particularly desirable in such situations as the connection for magnetos, and in fact all connections where considerable vibration or temporary lack of alinement is expected. It is also desirable, in making installations such as in timing devices for magnetos and the like, to provide for an adjustment to permit the regulation of such timing, and this adjustment is possible in this coupling.

I show on the drawing scale marks 24 on one member and scale marks 25 on the other, and a screw 23 on one of the members, for instance, the member 12, is unscrewed sufficiently to permit that end of the spring to assume its original form, the member 12 is slightly rotated around the spring until it is properly adjusted and the screw 23 is again screwed down. This adjustment can be quickly made and is easily accomplished.

It will be understood that various changes can be made in the details of construction, and various forms of attaching the spring to the coupling members can be used, without departing from the scope of this invention.

I claim:

1. A coupling comprising a spring secured to two coupling members, the winding of the spring being in a direction reverse to the direction of rotation, means for preventing the expansion of the spring, and means for adjustably securing the spring to one of the members.

2. A coupling comprising two cup-shaped members, a spring fitting in the members, and of substantially the same diameter as the inside diameter of the members, and means for securing the spring and the members against relative rotation, at least one of said securing means being adjustable.

3. A coupling comprising cup-shaped members with lugs on their inner faces, a spring fitting in the cup-shaped members and with its ends over the lugs, and means for exerting pressure on said ends for bending them over the lugs.

4. A coupling comprising cup-shaped members with lugs on their inner faces, a spring fitting in the cup-shaped members and with its ends over the lugs, and radially arranged screws in the sides of the cup-shaped members for bending the ends of the springs over the lugs.

In testimony that I claim the foregoing I have hereto set my hand this 16th day of September, 1919.

FREDERICK A. RUFF.